United States Patent [19]
Clark et al.

[11] 4,389,439
[45] Jun. 21, 1983

[54] EROSION RESISTANT TUBULAR APPARATUS FOR HANDLING SLURRIES

[75] Inventors: Eugene V. Clark, Northridge; George K. Sievers, Burbank, both of Calif.

[73] Assignee: Turbine Metal Technology, Inc., Burbank, Calif.

[21] Appl. No.: 279,827

[22] Filed: Jul. 2, 1981

[51] Int. Cl.³ .......................... B05D 7/22; B32C 1/08
[52] U.S. Cl. ................................... 428/36; 138/145; 138/146; 148/6.35; 427/237; 427/239; 427/249; 428/35
[58] Field of Search .................. 427/237, 239, 249; 148/6.35; 138/145, 146; 428/35, 36

[56] References Cited
U.S. PATENT DOCUMENTS 3,802,928 4/1974 Bopp ........................... 148/6.35 X
3,806,374 4/1974 Krzyminski ............... 148/6.35 X
3,809,583 5/1974 Krzyminski ................. 148/6.35
3,994,750 11/1976 Hehl .............................. 148/6.35 X Primary Examiner—James R. Hoffman
Attorney, Agent, or Firm—Wagner & Bachand

[57] ABSTRACT

Tubing, pump cylinders and tank vessels, and similar tubular apparatus for containing and conveying from a supply thereof a highly erosive composition slurry comprising fine particulates in a liquid medium and free of gross particulates along a predetermined path extending from a slurry supply is provided, and method therefor, the apparatus comrising a steel wall of elongated tubular configuration defining an interior surface confining the slurry on the predetermined path, the surface tending to erode though passing contact with the slurry, and an erosion resistant diffusion coating on the surface having an inner layer comprising intimately dispersed iron carbide and an outer layer consisting essentially of iron boride, in erosion blocking relation during conveyance of the slurry through the tubular apparatus.

22 Claims, 2 Drawing Figures

EROSION RESISTANT TUBULAR APPARATUS FOR HANDLING SLURRIES

TECHNICAL FIELD

This invention has to do with tubular apparatus, such as piping, pump cylinders and the like, and more particularly is concerned with such tubular apparatus having increased erosion wear resistance, enabling longer life in severe usage applications such as the pumping of finely particulate slurries, e.g. coal or concrete slurries.

BACKGROUND ART

Tubular apparatus is commonplace in fluid handling systems, e.g. tanks for storage, piping for transport, and pumps for fluid pressurization. Typically, the tubular apparatus is subject to wear primarily as a function of the chemical composition, temperature and abrasiveness of the fluid being handled. Severe use situations are found where two or more of the mentioned wear contributing factors are found together. In coal slurry handling, for example, and concrete pumping, chemically aggressive compositions are all the more difficult to handle because the myriad small particles which make up these slurries attack the tubular apparatus by a process referred to as erosion, the gradual wearing away of the surface of the tubular apparatus by continual bombardment with fine particulates, the process usually behing enhanced by the chemical nature of the slurry composition. In severe usage situations, the wear is caused not so much by large particle abrasion as by millions of minute contacts by the small particles which characterize fine particulate slurries.

Typically, the tubular apparatus is fabricated of steel, generally a carbon steel, and sometimes an iron base stainless steel. Such tubular apparatus can be improved in erosion wear resistance in accordance with the invention.

Importantly, the erosion resistance benefits conferred by the invention can be obtained locally in areas needing them, so that the entire fluid handling system need not be fabricated of exotic materials, nor coated entirely with a specialized coating which in fact is needed only here and there.

DESCRIPTION OF THE INVENTION

It is therefore an object of the invention to provide tubular apparatus. It is another object of provide tubular apparatus having improved wear resistance. Another object is the provision of a fluid handling system which is improved in erosion wear resistance, and a method of forming coatings on such apparatus and system components.

These and other objects of the invention to become apparent hereinafter are realized in a fluid handling system comprising a supply of a finely particulate slurry free of gross particulate and of a highly erosive composition, and tubular apparatus conveying the slurry from the supply along a predetermined path extending from the supply, the apparatus comprising a steel wall of elongated tubular configuration defining an interior surface confining the slurries on the predetermined path, the surface tending to erode through passing contact with the composition, and an erosion resistant diffusion coating on the surface having an inner layer comprising intimately dispersed iron carbide and an outer layer consisting essentially of iron boride, in erosion blocking relation during conveyance of the slurry through the tubular apparatus.

Typically, in the present fluid handling system the steel is a carbon steel or an iron base stainless steel, the surface diffusion coating may further comprise iron nitrides, the coating is 0.4 to 0.8 millimeter in depth, overall, with the coating outer layer of iron boride having a depth of from 0.5 to 0.06 millimeter and also being iron carbide containing.

Preferably in the present fluid handling system, the the iron boride layer is formed in situ in the wall surface by diffusion of born into the wall, subsequent to diffusing carbon into the wall, the wall being quenched after diffusion of the boron.

In preferred embodiments, there is provided tubular apparatus for containing and conveying from a supply thereof a highly erosive composition slurry comprising fine particulates in a liquid medium and free of gross particulates along a predetermined path extending from a slurry supply, the apparatus comprising a steel wall of elongated tubular configuration defining an interior surface confining the slurry on the predetermined path, the surface tending to erode through passing contact with the slurry, and an erosion resistant diffusion coating on the surface having an inner layer comprising intimately dispersed iron carbide and an outer layer consisting essentially of iron boride, in erosion blocking relation during conveyance of the slurry through the tubular apparatus.

In this embodiment too, typically the steel is a carbon steel or iron base stainless steel; the coating may further comprise iron nitrides produced by carbonitriding the surface in advance of boron diffusion; the coating has a depth of 0.4 to 0.8 millimeter overall, the outer layer of iron boride has a depth of 0.5 to 0.06 millimeter; the outer layer of iron boride is iron carbide containing, and formed in situ in the wall surface by diffusion of boron into the wall, subsequent to diffusing carbon into the wall by carburizing or carbonitriding, and the wall is quenched after diffusion of the boron.

The invention further contemplates the method of enhancing the erosion resistance of tubular fluid handling steel apparatus to finely particulate slurries free of gross particulate, which includes interposing an in situ formed iron boride diffusion coating between the steel on the interior of the tubular apparatus and the finely particulate slurry, and preferably carburizing or carbonitriding the tubular apparatus interior, and thereafter diffusing boron thereinto from a diffusion pack to form the coating.

BRIEF DESCRIPTION OF THE DRAWINGS

The invention will be further described as to an illustrative embodiment in conjunction with the attached drawings in which.

PREFERRED MODES

Figure 1:
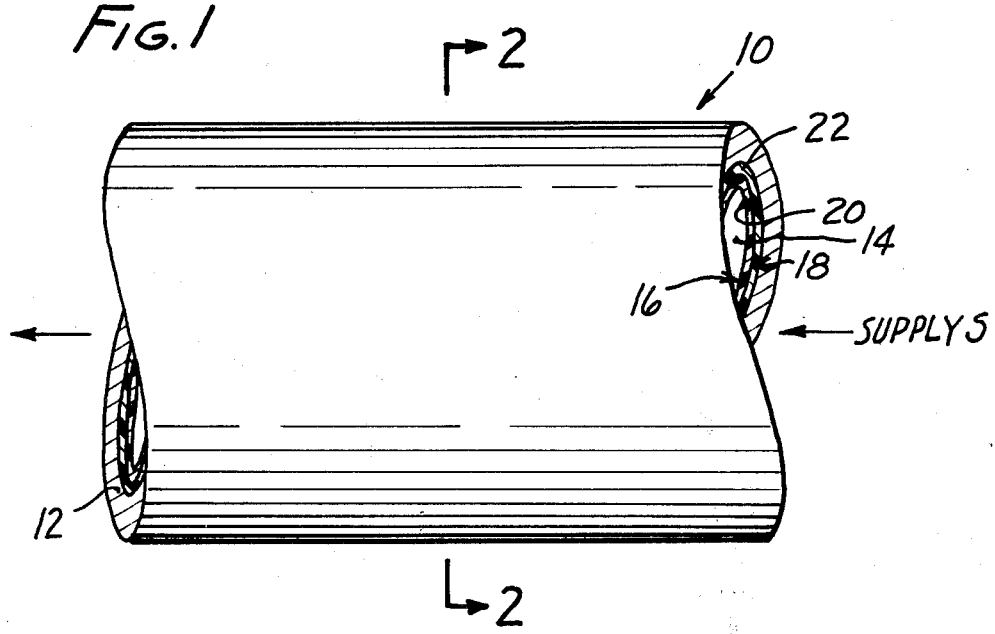
FIG. 1 is a fragmentary front elevation view, partly in section, of tubular apparatus diffusion coated on the interior in accordance with the invention.
Figure 2:
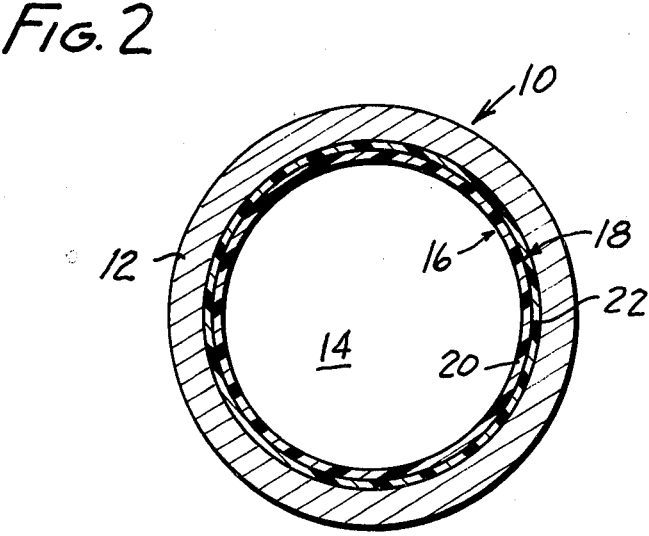
FIG. 2 is a view in transverse section thereof, taken on line 2—2 in FIG. 1.

Turning now the drawings in detail, in FIG. 1 a fragment of typical tubular apparatus is shown at 10 representative of a tubular section of a pump cylinder, piping, or a storage vessel or tank, or other apparatus subject to the flow of erosive composition fluids such as slurries, continuously or periodically. The apparatus 10 comprises a steel wall 12 defining a tubular passage 14 through which the fluid from supply S is flowed.

When designing a fluid handling system with the present tubular apparatus, those sections of piping, pump chambers and like parts expected to have severe erosion conditions are first coated in accordance with the invention, other parts subjected to less severe conditions need not be coated, to reduce costs, while substantially upgrading the overall system.

The coating of the tubular apparatus interior wall surfaces is effected by a two step diffusion as follows:

The surfaces to be coated are delineated, and first carburized or carbonitrided. Carbon from a suitable source, such as a commercial carburizing compound, or methane, in the case of carburizing, or sodium cyanide in the case of carbonitriding is diffused into the delineated areas by heating the area in contact with the carbon source for a time, e.g. 5 hours, and at a temperature, e.g. 1625° F., at which a subsurface carbon diffusion and formation of iron carbides and iron nitrides in the carbonitriding process, to a suitable depth, e.g. 0.4 to 0.8 millimeter, is realized. Since the tubular apparatus being thus surface conditioned is fabricated of steel, e.g. carbon steel or iron base stainless steel, iron carbides are formed in the tubing surface locally and responsive to the carbon diffusion thereinto.

The tubing is then subjected to boron diffusion under conventional conditions of time, temperature, and in an oxygen free environment from a diffusion pack of per se known composition. For example, the tubing with the iron carbide interior wall surface already formed in accordance with the carburizing or carbonitriding techniques described above, is immersed in a boronizing pack having typically the composition by weight:

Boron powder 2-10%
Halogen activator sufficient to activate the pack;
Aluminum oxide, the balance.

The pack is heated at 1650° F. for eight hours or until a diffusion of boron to a depth of about 0.5 to 0.06 millimeter is realized, the boron combining with the iron present in the tubing interior wall surface 16 to form coating 18 comprising iron borides in the presence of the iron carbides. By virtue of the sequencing of the carburizing and boron diffusing steps, the outer portion 20 of the coating 18 is relatively rich in iron borides, and the inner portion 22 thereof comparatively richer in iron carbides. The iron carbides are present in the predominantly iron boride outer portion 20 layer as well, of course. If carbonitriding is used, iron nitrides will also be present. The tubing is then quenched.

The result of the foregoing steps is a sequential iron carbide-iron boride modifications of the tubing surface 16 locally, corresponding to the portion or portions of the tubing locally subjected to diffusion. The portions to be treated are placed in the pack and the treatment carried out. The thus locally conditioned portions or portion areas show exceptional resistance to wear by erosion, caused by innumerable low energy impacts of fine particulates with the surface areas. This result is unexpected in fluid handling systems since there appears to be no known theoretical bases for predicting or explaining the improvement obtained. For example, conventional theories of support for a fragile coating as enhancing the performance of the coating would not seem to apply in the slurry handling tubing art where the impacts are minute, not heavy, and numerous, not infrequent. While not wishing to be bound to any particular theory, it is believed that the energy levels of the multitudinous impacts being low but continuous act to strip from the non-coated surface toms needed to keep the surface from eroding, and the formation of the presently described coating blocks this action, effecting the noted improvements.

The role of the iron carbide in the present invention is not clear, since from a theoretical viewpoint its presence should not result in substantial improvement of the iron boride diffusion coating. But surprisingly, there is a remarkably beneficial effect on the erosion characteristic of the coating with the iron carbide preformation. For example the iron boride alone typically will last only 75% as long as the iron carbide/iron boride combination diffusion coating, in a like tubing application. The iron carbide alone shows no improvement over the steel surface alone. A synergistic result therefore is obtained which was not predictable from a consideration of the component materials, prior to experimentation.

The invention thus provides a fluid handling system and tubular apparatus therefor which will operate longer, have fewer failures from erosion, and which is an improved tubing product over tubing previously known.

We claim:

1. Fluid handling system comprising a supply of a finely particulate slurry free of gross particulate and of a highly erosive composition, and tubular apparatus conveying said slurry from said supply along a predetermined path extending from said supply, said apparatus comprising a steel wall of elongated tubular configuration defining an interior surface confining said slurries on said predetermined path, said surface tending to erode through passing contact with said composition, and an erosion resistant diffusion coating on said surface having an inner layer comprising intimately dispersed iron carbide and an outer layer consisting essentially of iron boride, in erosion blocking relation during conveyance of said slurry through said tubular apparatus.

2. Fluid handling system according to claim 1 in which said steel is a carbon steel.

3. Fluid handling system according to claim 1, in which said steel is an iron base stainless steel.

4. Fluid handling system according to claim 1, in which said surface diffusion coating further comprises iron nitride.

5. Fluid handling system according to claim 1, in which said coating is 0.4 to 0.8 millimeter in depth.

6. Fluid handling system according to claim 1, in which said coating outer layer of iron boride is from 0.5 to 0.06 millimeter in depth.

7. Fluid handling system according to claim 1, in which said outer layer of iron boride is iron carbide containing.

8. Fluid handling system according to claim 1, in which said iron boride layer is formed in situ in said wall surface by diffusion of boron into said wall, subsequent to diffusing carbon into said wall.

9. Fluid handling system according to claim 1 in which said wall is quenched after diffusion of said boron.

10. Tubular apparatus for containing and conveying from a supply thereof a highly erosive composition slurry comprising fine particulates in a liquid medium and free of gross particulates along a predetermined path extending from a slurry supply, said apparatus comprising a steel wall of elongated tubular configuration defining an interior surface confining said slurry on said predetermined path, and surface tending to erode through passing contact with said slurry, and an erosion resistant diffusion coating on said surface having an inner layer comprising intimately dispersed iron carbide and an outer layer consisting essentially of iron boride, in erosion blocking relation during conveyance of said slurry through said tubular apparatus.

11. Tubular apparatus according to claim 10, in which said steel is a carbon steel.

12. Tubular apparatus according to claim 10, in which said steel is an iron base stainless steel.

13. Tubular apparatus according to claim 10, in which said surface diffusion coating further comprises iron nitride produced by carbonitriding said surface in advance of boron diffusion.

14. Tubular apparatus according to claim 10, in which said coating has a depth of 0.4 to 0.8 millimeter.

15. Tubular apparatus according to claim 10, in which said outer layer of iron boride has a depth of 0.5 to 0.06 millimeter.

16. Tubular apparatus according to claim 10, in which said outer layer of iron boride is iron carbide containing.

17. Tubular apparatus according to claim 15, in which said iron boride layer is formed in situ in said wall surface by diffusion of boron into said wall, subsequent to diffusing carbon into said wall by carburizing or carbonitriding.

18. Tubular apparatus according to claim 16 in which said wall is quenched after diffusion of said boron.

19. Tubular apparatus according to claim 17 in which said steel is a carbon steel or iron base stainless steel.

20. Tubular apparatus according to claim 17, in which said coating has a depth of 0.4 to 0.8 millimeter.

21. Tubular apparatus according to claim 19, in which said outer layer of iron boride has a depth of 0.5 to 0.06 millimeter.

22. Method of enhancing the erosion resistance of tubular fluid handling apparatus to finely particulate slurries free of gross particulate, including forming an iron boride diffusion coating on the interior surface of the tubular apparatus.

23. The method according to claim 21, including also carburizing or carbonitriding the tubular apparatus interior, and thereafter diffusing boron thereinto from a diffusion pack to form said coating.

* * * * *